E. TAYLOR.
FLYING MACHINE.
APPLICATION FILED AUG. 22, 1910.

1,171,075.

Patented Feb. 8, 1916.
4 SHEETS—SHEET 1.

E. TAYLOR.
FLYING MACHINE.
APPLICATION FILED AUG. 22, 1910.

1,171,075.

Patented Feb. 8, 1916.
4 SHEETS—SHEET 3.

UNITED STATES PATENT OFFICE.

EDWIN TAYLOR, OF FARMINGDALE, NEW YORK, ASSIGNOR TO DAVID M. NEUBERGER, OF NEW YORK, N. Y.

FLYING-MACHINE.

1,171,075.      Specification of Letters Patent.      Patented Feb. 8, 1916.

Application filed August 22, 1910. Serial No. 578,324.

*To all whom it may concern:*

Be it known that I, EDWIN TAYLOR, a citizen of the United States, and resident of Farmingdale, Long Island, New York, have invented certain new and useful Improvements in Flying-Machines, of which the following is a specification.

This invention relates to flying machines and more particularly to that type employing a plane or planes for the purpose of lifting the machine.

One of the objects of this invention is to construct a flying machine which will have maximum strength and stability with minimum weight of material, and which will have a low wind resistance with maximum lifting power.

Another object is to so construct and position the parts as to prevent interference of the moving parts of the machine, that is the propeller and controlling devices, with each other and with the frame.

Another object is to so distribute the component parts and the power plant that the center of gravity will be near the driver's seat.

Another object is to arrange the driving means and the power plant in a novel manner and to construct a novel form of power plant.

Another object is to provide balancing means which will be automatic in its operation, positive in its action and easily and simply controlled and which will balance the machine both longitudinally and laterally.

Another object is to provide automatic compensating means which will compensate against lateral wind pressure.

Another object is to provide the rudder or controlling plane or planes with a novel form of controlling or operating means and to make the connection in such a manner as to insure the greatest strength with the minimum material.

Further objects will appear from the detailed description taken in connection with the accompanying drawings, in which:

The frame consists essentially of a series of bars strengthened by tie wires and is essentially triangular in cross section. The entire frame is built around a central bar or rib 10 which extends substantially horizontally of the machine and which is normally in a longitudinal position. A pair of side bars 11 are secured to the central bar 10 at the front by means of a joint member 12, and at the rear by means of outwardly extending bars 13. A lower bar 15 is located substantially vertically below the central bar 10 and is connected at the front end to the joint member 12, and at the rear to the central bar 10 by means of an upwardly extending bar 16. The longitudinally extending bars which form the frame are braced vertically by means of braces 17 and horizontally by means of braces or ribs 14 which connect the side bars 11 to the central bar or rib 10. The connections between the braces and the longitudinal bars are made by suitable T, L, and cross fittings 18, 19 and 20, respectively.

Figure 3:
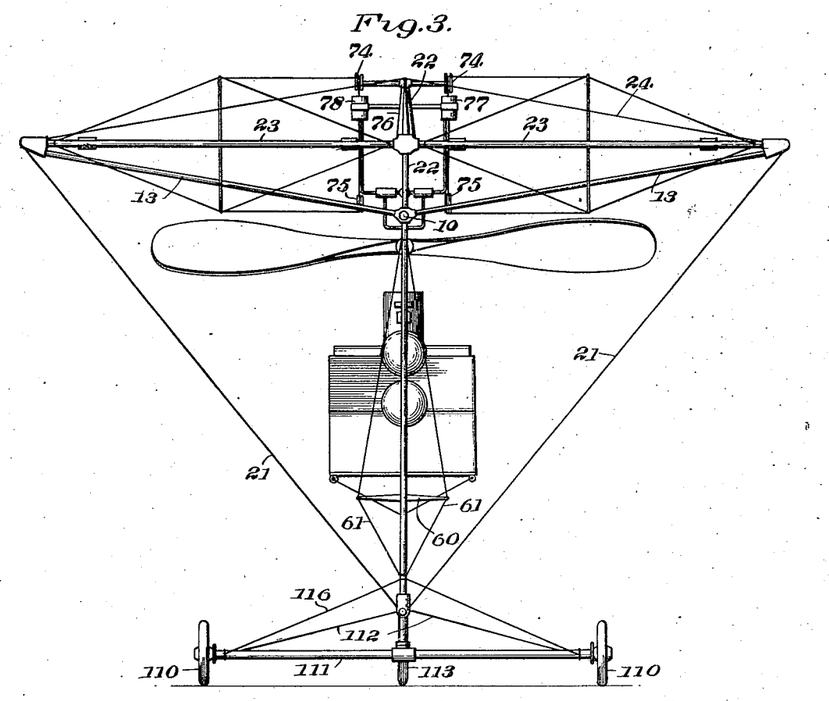
Fig. 3 is an end elevation.
Figure 4:
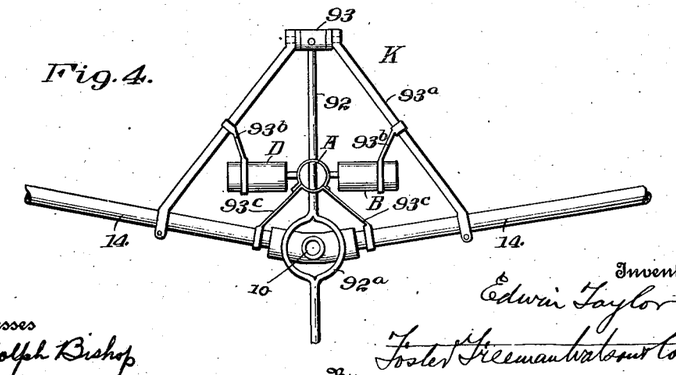
Fig. 4 is a detail view showing the method of supporting the mechanism which controls the balancing means.

The frame may be constructed of any light and strong material such as ash or spruce, or of hollow tubes of a metal having a low specific gravity such as aluminum and magnesium alloys. The side members 11 diverge outwardly and extend rearwardly so as to form a pair of lateral wings extending upwardly and outwardly from the center bar or rib 10, and increasing in width from the front to the rear. The frame is further braced by a series of tie wires 21, as shown in Fig. 3, so that the frame is generally of triangular cross section.

It will be understood that the wings are covered with a suitable covering material so as to form suitable supporting planes, the covering being however omitted in the drawings for the sake of clearness.

Figure 1:
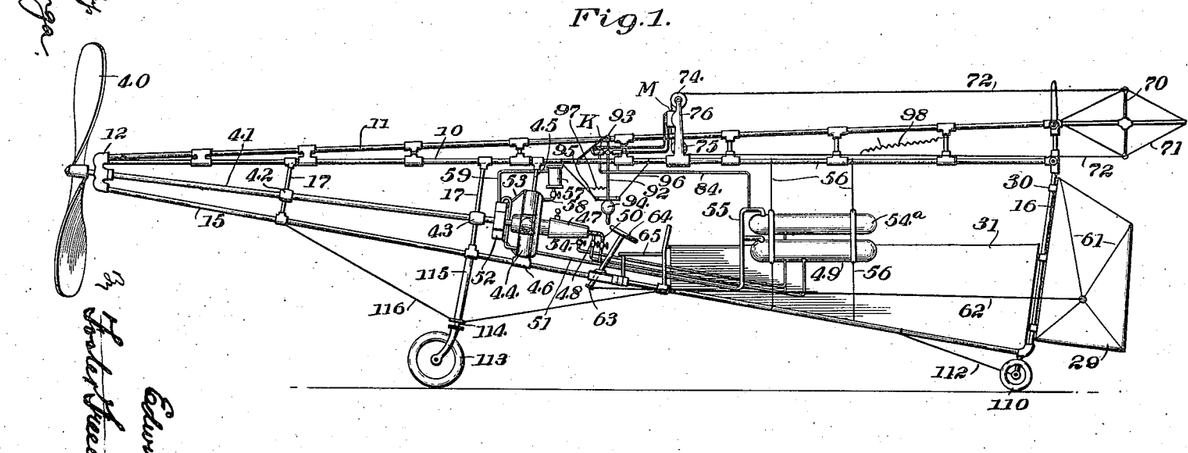
Figure 1 is a side elevation of a flying machine embodying this invention.
Figure 2:
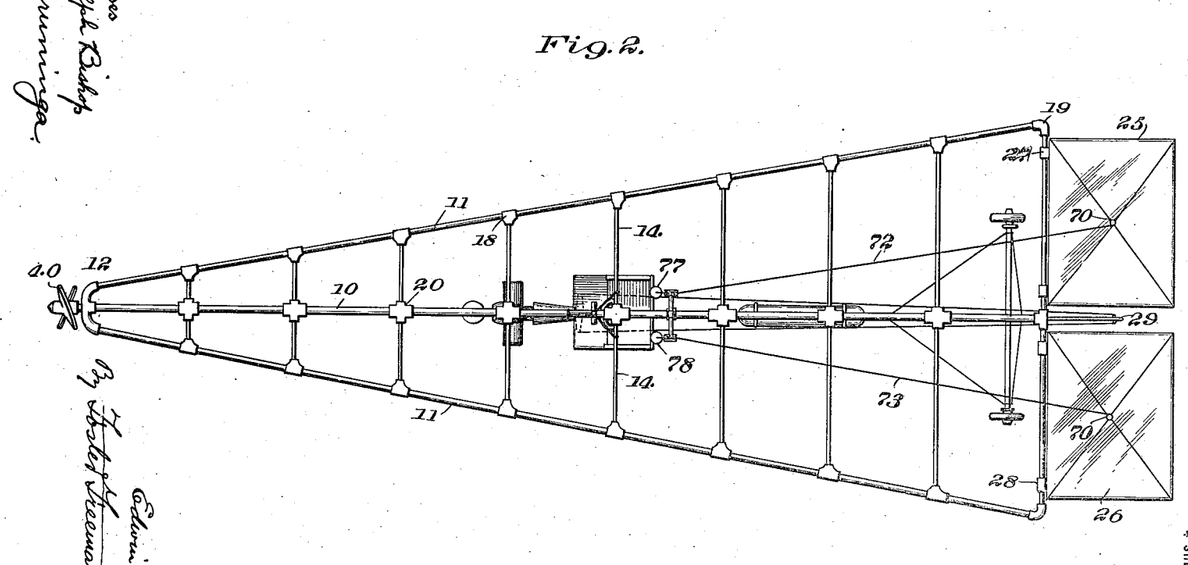
Fig. 2 is a plan view.

A vertically extending post 22 is mounted centrally at the rear of the frame and is connected to the rear extremities of the wings by means of a cross bar 23, and is further braced by means of suitable tie wires 24. The cross bar 23 forms a support for a pair of pivotally mounted planes or ailerons 25, 26, which are hinged to the bar at 27 and 28. These ailerons comprise a suitable framework which is covered with suitable material so as to form plane surfaces. A vertical rudder 29 is pivoted on the rear vertical bar 16, at 30, and also comprises a framework covered with suitable material. A vertical plane member 31 extends forwardly from the rear vertical bar 16 to the operator's seat 65 and is secured to the back thereof as shown in Fig. 1.

A propeller 40 is mounted at the front end of the machine and is secured to a rearwardly extending shaft 41, which is supported in a bearing in the joint member 12 and in bearings 42 and 43 in the vertical braces 17. The rear end of the shaft is secured to the rotor of a suitable engine 44 which is secured to and supported from the bars 10 and 15 at 45 and 46.

The engine may be of any suitable type and of any suitable construction, but preferably is of the form shown and described in my Patent No. 1,013,907, issued January 9, 1912. The engine comprises a plurality of cylinders which are spaced around an inclosed crank chamber, and the chamber of this engine is connected to the rear of the shaft 41. A fluid supply generator consisting of a combustion chamber 47 is constantly connected to the interior of the crank chamber and also supplies working fluid to the ends of the cylinders. The combustion chamber is supplied with air, a combustible fuel, such as a hydrocarbon, and preferably a jet of water or steam so as to form the working fluid. A valve 48 controls the admission of a combustible fuel which is stored in the tank 49, and a valve 50 controls the air which is supplied by means of a pipe 51 from the pump 52 which is driven by the engine and supported from one end thereof by means of brackets 53. A valve 54 controls the supply of water from a tank 54$^a$. This water is preferably discharged into the water jacket for the combustion chamber so as to be turned into steam before it is admitted and mixed with the burned gases, but it may, if desired, be admitted directly. In order that the water and fuel may be supplied under pressure, the tops of these tanks have pipe connections 55 with the compressed air pipe so that the pressures in these tanks will be the same as in the pump and higher than in the combustion chamber. The tanks 49 and 54$^a$ are supported from the bars 10 and 15 as shown at 56. An oil tank 57 is supported on the engine frame and has pipe connections 58 and 59 with the engine and pump, respectively, so as to supply lubricant thereto. The power plant thus briefly described is described and shown in my patent hereinbefore referred to.

The rudder 29 has mounted thereon a cross bar or member 60 which is located near the center thereof and removed from the hinge. This cross bar is supported and braced from the frame of the rudder by means of a series of tie wires 61. The ends of the braces have connected thereto steering wires 62 which extend forwardly and connect with the sector 63 on the lower end of the steering post of a steering wheel 64 which is mounted in front of the operator's seat 65. This seat is suitably supported and braced from the bar 15 as shown in the drawings.

The ailerons 25 and 26 have supported thereon the vertically extending bars 70 which are braced and supported from the frames of the ailerons by means of suitable tie wires 71. Controlling wires 72, 73 extend forwardly from the bars 70 and over pulleys 74 and 75 which are supported upon a vertically extending bracket 76 secured to and supported from the central bar 10. This bracket has supported thereon a multiple unit motor M comprising a pair of cylinders 77, 78, the pistons 79 and 80 of which connect, respectively, with the wires 72 and 73, so that each of the motors is adapted to operate and control the position of one of the ailerons. The motor cylinders are double acting and are controlled by a controller K.

Figure 5:
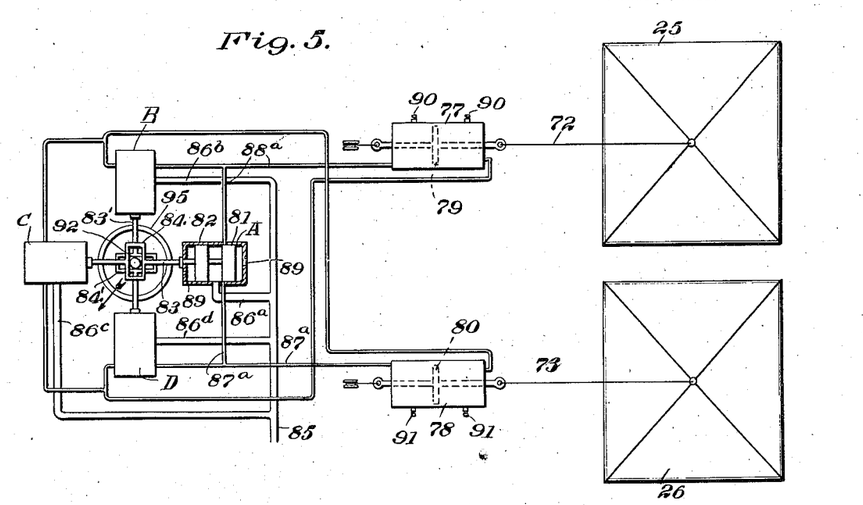
Fig. 5 is a diagrammatic view showing the controlling devices for balancing the machine.

Referring now to Fig. 5, which shows a diagrammatic arrangement of the motor and controller for controlling and governing the position of the ailerons, this controller, as shown, consists of four cylinders, A, B, C and D. The cylinder A is shown in cross section and is provided with a balanced piston comprising separated piston heads 81 and 82 connected to a piston rod 83 which has secured to it a slotted cross head 84. The cylinders A, B, C and D are supplied with compressed air from the pipe 85, the compressed air being distributed to the different cylinders by means of branches 86$^a$, 86$^b$, 86$^c$, 86$^d$. Each of the controlling cylinders is provided with a pair of oppositely arranged ports which are connected to the motor cylinders as shown in Fig. 5, and in a manner hereinafter to be described. Thus the controlling cylinder A has one port thereof connected to the lower end of the motor cylinder 78 by means of pipe connections 87$^a$, and the opposite port to the lower end of the cylinder 77 by means of pipe connections 88$^a$. The connections from the remaining cylinders B, C and D can be easily traced from Fig. 5. Each of the controlling cylinders has its heads apertured or perforated as shown at 89 so as to allow for a free movement of the piston, but at the same time to give a slight dashpot effect. The motor cylinders 77 and 78 are provided near their ends with apertures or openings controlled by valves 90 and 91, respectively.

The piston rods of the opposing controlling cylinders are connected to a single cross head. Thus the piston rods of cylinders A and C are connected to the single cross head 84, while the piston rods of cylinders B and D are connected to the single cross head 84'. The slots in these cross heads cross each other, as shown in Fig. 5, and the width of the slots in the cross head is substantially equal to the diameter of a controlling lever 92, which is mounted for universal movement at 93 upon a frame 93ª, which is supported from the ribs or braces 14 of the frame. The controller cylinders B and D are supported from the frame 93ª by means of brackets 93ᵇ, and the cylinders A and C are supported from the ribs or cross members 14 by means of brackets 93ᶜ. The controlling lever 92 extends through the cross heads 84 and 84' and downwardly and is provided at its lower end with a weight 94 and a handle. A ring 95, supported from the frame by means of brackets 96, extends around the lever 92 so as to limit its movement, and the lever is bifurcated as shown at 92ª so as to clear the central bar 10. A compensating spring 97 is secured to the lever 92 and to one arm of the bracket 96 for a purpose hereinafter to be described.

The construction and operation of the balancing means will now be described. If the machine tips or pitches forwardly it is necessary to swing both of the ailerons upwardly. On the other hand if the machine pitches rearwardly then it is necessary to depress both the ailerons. If the machine inclines laterally and to the left, looking forwardly from the rear Fig. 3, then it is necessary to depress the left aileron and also to raise the right one. On the other hand if the machine inclines to the right then it is necessary to depress the right aileron and raise the left.

The controlling cylinders A, B, C and D are so constructed that the pistons or valves must be moved toward the head ends of the controlling cylinders in order to open the ports. A movement of the piston valve in the cylinder A, Fig. 5, for instance, toward the left will only cover the ports to a greater extent. It will thus be seen that the opening movement of the valve for the cylinder A, for instance, will not open the ports in the cylinder C, and vice versa.

Referring now to Figs. 1 and 5, if the lever 92 be moved rearwardly, which may be done manually, then the ports in cylinder A will be opened to the compressed air pressure from the branch pipe 86ª. This will admit fluid to the lower ends of both motor cylinders 77 and 78 causing the pistons therein to rise and depress both ailerons simultaneously and to the same extent. A forward movement of the lever 92 will cause the ports in cylinder C to be opened to the air from pipe 86ᶜ so as to cause the air to be admitted to the upper ends of the motor cylinders, causing the pistons in the cylinders to travel downwardly and raise both ailerons simultaneously and to the same extent. A movement to the right of the lever 92 will cause the ports in cylinder B to be opened, causing the compressed air from pipe 86ᵇ to be admitted to the bottom of cylinder 77 and to the top of cylinder 78, causing the right aileron 25 to be depressed and the left aileron 26 to be raised. A movement of the lever 92 to the left will cause the ports in cylinder D to be opened, thereby admitting fluid from the pipe 86ᵈ to the top of cylinder 77 and the bottom of cylinder 78, causing the right aileron 25 to be raised and the left aileron 26 to be depressed. A diagonal movement of the lever 92 will cause the ports in two of the controlling cylinders to be opened. Thus a movement in the direction of the arrow, Fig. 5, will cause the ports in both cylinders C and D to be opened. It will be readily seen that the effect of the port openings will be accumulative either positively or negatively. Thus if we suppose that the lever 92 is moved along the line of the bisector between the angles formed by the piston rods, i. e. in the direction of the arrow, then, since the opening of the ports in cylinder C will admit fluid to the upper ends of both cylinders 77 and 78, and since the opening of ports D will admit fluid to the top of cylinder 77 and the bottom of cylinder 78, the port openings of cylinders C and D for the top of 77 will be accumulative and will correspond to a double port opening of one cylinder, whereas since the fluid is admitted to both the top and bottom of the cylinder 78, the pressures on opposite sides of piston 80 will counterbalance each other so that the piston 80 and the aileron 26 will be maintained in mid position. The effect of the above described movement of the lever 92 therefore is to raise the aileron 25 a double amount while the aileron 26 is held stationary. It will be seen that the effect of the movement of the lever 92 in any given direction will be additive or subtractive, depending upon the direction in which it is moved. This furnishes an exceedingly accurate construction for automatic control as will appear hereinafter.

The lever 92 is weighted at its lower end and is pivoted at its upper end for free universal movement. Thus since this lever will tend to be maintained by gravity in a substantially vertical position, any tipping or unbalancing movement of the machine will cause the lever to be moved relatively to the machine. Strictly speaking the machine will tip in space with respect to the lever but it is convenient to consider the lever as swinging with respect to the machine since it is merely a relative movement any way. Thus if the machine pitches forwardly the lever 92 will swing forwardly with respect to the machine and open the ports in cylinder C. This will cause the fluid to be admitted to the tops of both cylinders and therefore will cause both ailerons to be automatically raised, thereby automatically bringing the machine back to a level and balanced position. Similarly a rearward pitch of the machine will cause the lever 92 to be moved rearwardly so as to open the ports in cylinder A and admit pressure to the lower ends of the motor cylinders thereby causing both ailerons to be automatically and simultaneously depressed, thereby righting the machine. It will be readily seen that a pitch action to the left will cause the left aileron to be automatically depressed and the right aileron to be automatically and simultaneously raised, while a pitch to the right will cause the right aileron to be automatically depressed and the left aileron to be automatically raised. A compound pitch will bring about the same result. Thus if we consider that the machine pitches both forwardly and to the left, or along the 45° line Fig. 5, then in order to compensate for the forward pitch it is necessary that both ailerons be raised, and to compensate for the lateral pitch the aileron 25 must be raised and the aileron 26 must be lowered. If the pitch is a 45° pitch then the aileron 25 must be raised a double amount while the amount of movement necessary for the forward and lateral pitches, respectively, will just balance each other as to the aileron 26, and therefore this aileron must remain stationary or in mid position. It was shown above that this will result if the lever 92 is moved on the 45° line. It will be readily seen that any compound unbalancing movement of the machine will give a similar compound movement to the lever 92, thereby actuating the ailerons or balancing members just the right amount in order to bring the machine automatically to a balance.

In order to compensate for the weights of the ailerons and in order to bring these ailerons back to mid position each may be provided with a spring 98 which holds it in substantially mid position. After the fluid has been admitted to the cylinders and the machine begins to right itself so that the valves are again closed and the fluid to the motor cylinder cut off, the fluid in the cylinders is discharged through the exhaust apertures or ports 90. These ports are of course small enough so that they will not discharge the fluid as fast as it is admitted but at the same time they will permit the fluid to escape slowly after it has been cut off. This is advantageous for the reason that it retards the movements slightly so as to furnish a kind of a dashpot arrangement whereby overthrow and vibration will be prevented. The pressure on both sides of pistons 79, 80 is also normally equalized so as to permit the ailerons to be normally maintained in mid position. The dashpot arrangement of the valve pistons will likewise take care of any slight vibrations so as to prevent actuations of the valves except when there is a real unbalancing of the machine. It will thus be seen that this invention provides a very convenient arrangement which will automatically balance the machine, the balancing means being set in operation by the unbalancing movement of the machine.

Figure 6:
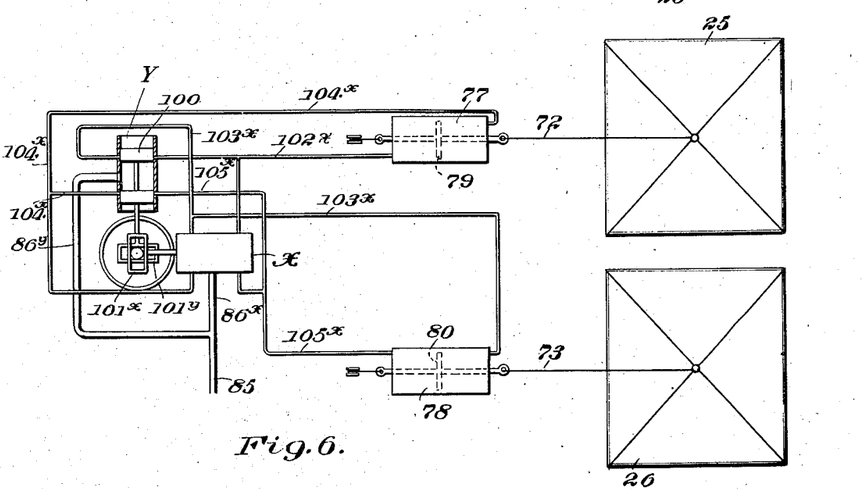
Fig. 6 is a similar diagram showing another form of this invention.

Fig. 6 shows a slightly modified form of controller for the motor M in which two cylinders perform the functions of four. It will be seen that in this case the valve pistons are double acting. The head end of cylinder X performs the functions of cylinder A and the cross head end that of cylinder C, while in the case of cylinder Y the head end performs the function of cylinder B while the cross head end performs the function of cylinder D. One of the cylinders, namely, Y, is shown in section. Fluid is admitted to the center between the pistons of the valve by means of branch pipes $86^x$, $86^y$ connected to the fluid supply pipe 85. The piston 100 of the cylinder Y is connected to a cross head $101^y$, while the piston of cylinder X is connected to a cross head $101^x$. The connections to the motor cylinders are similar as shown in Fig. 5. Thus the head end of cylinder Y, which corresponds to B, Fig. 5, has its ports connected by pipes $102^x$ and $103^x$ with the lower end of cylinder 77 and the upper end of cylinder 78, respectively. Similarly the cross head end of cylinder Y, which corresponds to cylinder D in Fig. 5, has its ports connected by means of pipe connections $104^x$ and $105^x$ to the upper end of cylinder 77 and the lower end of cylinder 78, respectively. The other connections can be readily traced out and it will be seen that the operation of this construction is very similar to that shown in Fig. 5, but only two cylinders are required, thereby simplifying the construction very much.

The frame is arranged to be supported on a pair of rear wheels 110 which are mounted on an axle 111 and braced by tie wires 112. The front wheel 113 has a dashpot connection with the frame by means of a plunger 114 entering a hollow tube 115 secured near the forward end of the rod 15. This tube 115 is also braced by means of tie wires 116. The supporting wheels permit the machine to be started from the ground and the dashpot connection takes up shocks in landing.

It will be noted that the wings diverge from the front to the rear. In aeroplanes as now constructed it has been the practice to make the planes of substantially maximum width at the forward ends. In these constructions the wings strike the air so as to force it downwardly and set it in motion in a downward direction, so that in order that an air support may be obtained for the rearward parts of the planes these planes must be curved downwardly. This necessarily results in an increase of air resistance. In accordance with this invention the wings or planes diverge rearwardly so that the wings will continually strike fresh portions of air which has not been deflected downwardly and which has not been set in motion. Thus, if we consider a point O on the plane, when the machine enters a certain part of undisturbed air, an amount of air will be set into motion and deflected downwardly substantially equal to the width of the plane at O. As the machine progresses forwardly, since the width of the plane increases progressively, the edges of the plane will progressively reach out and obtain a hold on fresh undisturbed air. In this way the machine is supported on undisturbed air at its side edges along substantially its entire length. By means of this construction the plane can be a plane surface and need not be curved downwardly, as in present constructions where the plane has its maximum width at the forward edge, thereby setting the entire air supporting strata in motion and deflecting it downwardly. The angle of the machine will also be small in view of the fact that the supporting surface increases from front to rear. The progressive increase of width from front to rear can be so proportioned that the machine will be supported practically uniformly along its entire length. By means of this construction the wind resistance is reduced to a minimum.

It will be seen that the propeller is arranged at the front of the machine and that the axis of the driving shaft 41 inclines upwardly and forwardly. In this way the propeller will not only drive the machine forwardly but will also act as a lifting propeller to partly compensate for the decrease in supporting area presented by the front part of the machine. This construction not only permits the machine to start off the ground more easily but also places the propeller where it should be, namely, in full view of the operator and where it can operate most efficiently in obtaining a driving grip on the air. By placing the propeller forwardly the interference with the other machine parts is also reduced to a minimum, since any broken wire will naturally extend rearwardly where it will not be struck by the propeller.

The plane 31 forms a keel which will balance or compensate for the lateral pressure on the wings. The area of this keel is substantially the same as the lateral area presented by the wings so that any side wind pressure will be automatically balanced and compensated for by the area of the keel.

It is exceedingly advantageous to operate the balancing means of an aeroplane by a motor. Where machines are of heavy construction, as will undoubtedly be the practice in the future, some sort of a motor must be provided for controlling the balancing means. This is especially true of automatic balancing means. Thus it will be absolutely impractical to connect the pendulum device 92 directly with the ailerons and expect this pendulum to automatically control the position thereof, for this would require an exceedingly heavy weight which would have a considerable inertia and which would present an exceedingly large surface to wind pressure. In addition the weight that would be required would be absolutely prohibitive on a machine of this character where the weight must be kept down, but by operating the balancing members by a motor this motor can be automatically controlled since the controlling means can be very delicate in construction and very easy to operate. The motor can of course be exceedingly small and light, especially where the air pressure can be high, as in this case. It may be placed in the rear directly at the aileron hinges, and the pipes from the controller run rearwardly. An additional advantage is obtained in this case by constructing the motor as a fluid pressure motor in view of the fact that the fluid is already there and must be provided anyway for use in operating the engine. The function of the spring 95 is to compensate for wind pressure on the lever 92. If the spring were not provided then the wind pressure would necessarily throw this lever rearwardly when the machine is speeding through space, but this spring, which may be adjusted to any desired extent, is adapted to exactly compensate for wind pressure and to hold the lever in neutral position.

It has been the previous practice to connect the wires for the rudder and like controlling planes to a transverse rod which is connected to the rudder at the pivot. This of course requires considerable bracing for the rudder and it necessarily requires that the frame be of heavy construction. However by mounting the transverse rod near the center this rod can be conveniently braced by light wires so that the actual framework of the rudder or the controlling member may be merely an outside skeleton.

It will be seen that the machine is of substantially triangular section throughout thereby presenting the minimum wind resistance with maximum lifting power and minimum weight. This triangular structure together with the location of the keel 31 centrally below the wings, results in great stability and strength. By providing a horizontal hinge support 23 for the ailerons, interference between these ailerons is prevented without the necessity of cutting away the adjacent edges.

The power plant and the other parts are so distributed that the center of gravity is substantially at the driver's seat so that the weight of the driver will have no effect in disturbing the stability of the machine. The machine is entirely automatic in its balancing but at the same time may be manually controlled at any time in view of the fact that the controlling lever 92 extends near the operator's seat.

It is obvious that various changes may be made in the details of construction without departing from this invention and it is therefore to be understood that this invention is not to be limited to the specific construction shown and described.

I claim—

1. In a flying machine, in combination, a plane, a propeller at the front end thereof, said propeller mounted to rotate in a plane at an angle to the horizontal when said machine is at rest; a pair of ailerons at the rear end thereof, a rudder below the said ailerons and automatically controlled means for simultaneously adjusting said ailerons in opposite directions and to different angular relations with respect to each other and to the plane.

2. In a flying machine, in combination, a plane converging from the rear to the front, a propeller at the front end of the plane exerting both a forward driving and a lifting effort, an engine and shaft for said propeller, a plurality of independently and relatively movable ailerons at the rear end of the plane, operating means for said ailerons and means on said engine shaft supplying means to operate said aileron operating means.

3. In a flying machine, in combination, a plane converging from the rear to the front, a propeller at the front end of the plane exerting both a forward driving and lifting effort, a plurality of independently and relatively movable ailerons at the rear end of the plane, and an engine connected to the propeller and means connected to said engine for operating the ailerons, said means comprising an air pump, air tank, air motor and connections.

4. In a flying machine, the combination of a supporting means therefor, a frame mounted on the supporting means and comprising a substantially horizontally arranged central bar, side bars secured to the central bar at its forward end and extending rearwardly and at an angle thereto, a centrally arranged downwardly and rearwardly extending bar connected to the central bar at its forward end and to the side bars and forming with the latter a frame triangular in contour, and a shaft journaled within the frame and projecting therefrom at the front end, a propeller mounted on the projecting end of said shaft, and a motor mounted on the other end of the shaft.

5. In a flying machine, the combination of a frame triangular in cross section and comprising bars converging at their forward ends and connected at their rear ends to form a structure triangular in marginal outline, a shaft projecting from the front end of the aeroplane, a propeller mounted on the projecting end of the shaft, the other end of the shaft terminating within the frame, a fluid compressor supported on said shaft, a motor also supported on the shaft and arranged to operate the propeller and fluid compressor, balancing means at the rear end of the frame, means including fluid-operated mechanism for actuating said balancing means and connections between said fluid-operated mechanism and the fluid compressor.

6. In a flying machine, the combination of a frame comprising a substantially centrally disposed bar, side bars connected to said centrally disposed bar and forming therewith plane supporting surfaces, a propeller mounted at the forward end of said central bar and arranged to rotate at an angle thereto, automatic balancing means including ailerons mounted to rock about a pivot transversely to said centrally arranged bar, a motor operatively connected to each aileron, a bracket on the centrally arranged bar for supporting the motors, and common means for controlling the operation of the motors.

7. In a flying machine, the combination of a plane carrying frame triangular in marginal outline and cross-section, and built up of members converging at the front end of the machine, a central bar extending substantially horizontally of the machine, a shaft disposed below and at an inclination to said central bar and projecting beyond the ends of said converging members, a propeller on the projecting end of the shaft, and a motor connected to the propeller shaft and disposed within the outlines of said triangular frame.

8. In a flying machine, the combination with a pair of planes converging at the front end of the machine, an aileron at the rear end of each plane for balancing the machine, a pair of motor cylinders, a piston located in each cylinder, each piston having a rod connected to an aileron, a multiple unit fluid pressure valve mechanism connected with each motor cylinder and controlling the supply of fluid thereto, and an automatic controller for the fluid mechanism.

9. In a flying machine, the combination of a central and substantially horizontally disposed rod, a pair of rods disposed in a plane above said central rod and converging toward a common point near the end of said central rod, a lower centrally disposed rod extending at an angle to said horizontal rod, means connecting said rods at the front and rear end to form a frame structure, a shaft supported by part of said connecting means and having one of its ends extending beyond the end of the frame, and the other end disposed within the frame, a propeller mounted on the outer end of the shaft and a motor within the frame connected to drive the shaft, said shaft and centrally disposed rods being disposed in the same plane.

10. In a flying machine, the combination of a frame triangular in marginal and cross-sectional outline, and built up of members converging at the front end of the machine, a pair of supporting wings inclined upwardly from a member of said frame extending along the center, ailerons mounted at the rear of said frame, a shaft having one end projecting from the front end of the frame and being inclined downwardly beneath said wings and having its other end located within the frame, a propeller mounted on the front end of the shaft and adapted to exert a forward driving and lifting effort, an engine connected with the inner end of said shaft, a fluid compressor connected to be operated by said engine, and means including connections whereby said compressor automatically operates said ailerons.

In testimony whereof I affix my signature in presence of two witnesses.

EDWIN TAYLOR.

Witnesses:
J. H. BRUNINGA,
J. A. WATSON.